Figure 2:
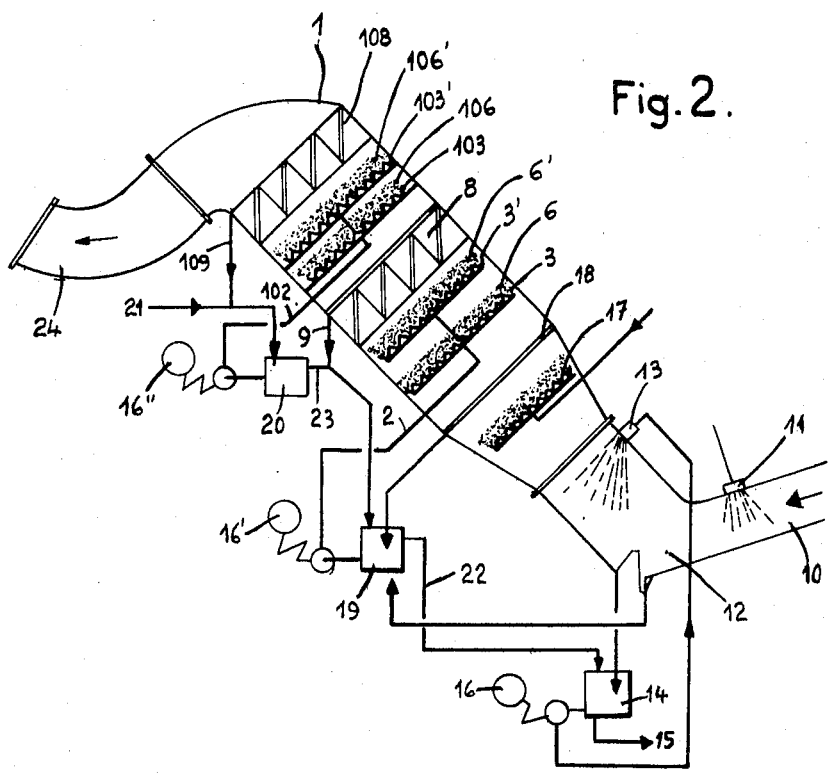

March 1, 1966 N. HVOSTOFF ETAL 3,237,381
METHOD AND MEANS FOR TREATING MOVING GASES BY LIQUIDS
Filed July 2, 1962

INVENTORS
NICHOLAS HVOSTOFF
LOUIS GRULET
MICHEL COMTE
GERARD THAREAU
By
OSTROLENK. FABER, GERB & SOFFEN
ATTORNEYS

United States Patent Office 3,237,381
Patented Mar. 1, 1966

3,237,381
METHOD AND MEANS FOR TREATING MOVING GASES BY LIQUIDS
Nicolas Hvostoff, Dourdan, Louis Grulet, Pau, Michel Comte, Arthez de Bearn, and Gerard Thareau, Aubervilliers, France, assignors to Societe Nationale des Petroles d'Aquitaine, Paris, France
Filed July 2, 1962, Ser. No. 206,652
Claims priority, application France, July 5, 1961, 866,973
5 Claims. (Cl. 55—89)

Our invention has for its object a method and means for setting a moving stream of gases in contact with liquids, chiefly with a view to exchanging heat and/or mass. It is applicable both to gases and liquids considered alone and to the suspensions of solid particles in liquids and/or gases.

A large number of prior arrangements are known wherein a gas is brought into contact with a liquid on which it is to act physically or chemically. A conventional system consists in a spraying tower or in a filled tower. These known arrangements are bulky whenever it is desired or attempted to obtain a marked mutual interaction between the gas and the liquid. Furthermore, they often lead to a considerable loss of head.

Our invention, on the other hand, permits obtaining a high efficiency for the treatment of a gas by a liquid or, conversely, resorting to a very compact arrangement, the loss of head of the gas passing through said arrangement being considerably reduced with reference to the present day technique. Our invention allows executing the desired treatment, even when the component which is to be considered primarily is present only in slight concentrations in the liquid and/or the gas. In other words, liquids and gases in a diluted condition, may be treated efficiently in accordance with our invention, whereas this could be obtained only with difficulty in the case of the prior art.

Our invention also permits the simultaneous execution, in the same apparatus, of several reactions or treatments with a separation of the products obtained.

The novel method to be disclosed hereinafter consists in producing inside a chamber, one or more volumes constituted by fine droplets of liquid, in making the gas pass through said volumes so as to carry the droplets along and to thereafter deposit the same, entirely or partly, through physical means and separating the liquid thus precipitated.

The volumes of fine droplets, according to our invention, form mists extending throughout the cross-section of the chamber through which the gases pass, and over a predetermined depth which may be adjusted as desired.

Our method may include the repeated use of the liquid already precipitated, so as to produce such mist-forming volume or volumes of fine droplets. It is also possible to resort to different liquids producing successive mists for the treatment of the same gas.

According to a particular feature of our invention, the mists are obtained by the interengagement of a plurality of liquid jets, projected under predetermined angles, in the direction of progression of the gases or against said direction.

The precipitation of the mists after they have travelled over a predetermined length, may be provided for the totality of the droplets or only for a fraction thereof, that is the larger-sized droplets. This is obtained by any physical means such as an impact on a rigid surface, the action of an electrostatic field or the like. A very practical embodiment consists in making the droplets impinge on stationary hindrances.

The arrangement according to our invention includes primarily a chamber, means for making the gas or gases to be treated flow through it, at least one or more systems projecting fine droplets of liquid or one or more series of such systems with a view to forming a mist or volume of droplets, in one or more cross-sections of the chamber, together with means for precipitating the mist, on the downstream side with reference to the droplet projecting system and to the direction of movement of the gas, and also means for collecting and, if required, recycling the precipitated liquid.

An improved embodiment of the arrangement includes inside a common chamber a succession of several systems for projecting droplets or series of such systems together with means for precipitating them subsequently, whereby a plurality of contact stages between the gas and the volumes of liquid droplets is obtained.

The chamber is constituted, according to requirements, by a container, a tower, a casing, a pipe or a tube of which the cross-sections and outline may vary according to the application. In particular, the cross-sections may be circular, elliptical, polygonal or the like. Although a rectilinear longitudinal shape is the simplest, it may be of interest to give the chamber, chiefly when it is constituted by a pipe, a curvilinear shape, say the shape of a spiral or that of a broken line.

The length of the chamber, that is its dimension in the direction along which the gas is to flow, may extend horizontally, vertically, obliquely or along several angles or curves in succession. In a particularly advantageous embodiment, the chamber slopes with reference to horizontality, preferably under an angle approximating 45°.

The arrangement is, if required, provided also with heating and/or cooling means located outside or inside the chamber walls. It may also be associated with pipes for injecting various reagents, with means measuring temperature, throughputs, concentrations and the like or with any other useful auxiliary arrangements.

In a preferred embodiment of our invention, each system projecting liquid droplets is constituted of a series of nozzles positioned in the same transverse plane of the chamber, the openings of said nozzles being directed towards the downstream end of the gasiform stream. Several series of droplet-projecting systems arranged in a plurality of transverse planes of the chamber ahead of the liquid precipitating means facilitate the formation of volumes of droplets as large and heavy as may be desired.

The method and apparatus according to our invention may serve for various applications: chemical reaction between gases and liquids or suspensions, removal of dust out of the gases, cleaning of gases or smokes before they are rejected into the atmosphere, recovery of volatile solvents by means of liquids of a higher specific weight, exchange of heat between gases and liquids, drying of a gas by a liquid dehydrating reagent and like treatments which require an intimate contact between a gas and a suspension of solid materials in the liquid.

Figure 1:
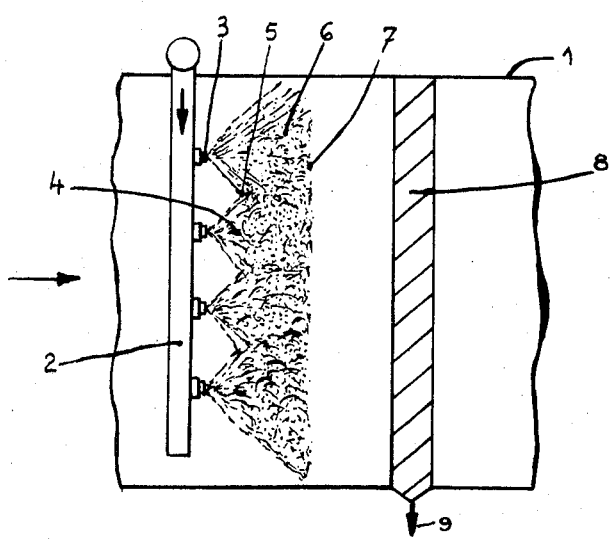

Our invention is illustrated in one of its preferred embodiments and is described hereinafter by way of example and in a non-limiting sense. In the accompanying drawings:

FIG. 1 illustrates diagrammatically in longitudinal cross-section, a fraction of the arrangement according to our invention, FIG. 2 is also a diagrammatic view of a complete arrangement shown in longitudinal cross-section.

In FIG. 1, the chamber 1 of the apparatus is associated with a liquid feeding pipe 2, opening into the nozzles 3. Of the latter only four are shown which appear as aligned but in practice, a large number is distributed as required throughout the transverse cross-section of the chamber in a plane perpendicular to the plane of the drawing.

The nozzles 3 feed jets of liquid assuming a conical shape as shown at 4, said jets interengaging each other along lines 5 so as to produce a heavy mist of droplets 6. The depth of the heavy mist extends between the transverse planes passing through points 5 and 7 and may be adjusted through adjustment of the throughput of the nozzles, and also of the input of treated gas entering the chamber in the direction of the arrow drawn on the left hand side of the FIG. 1; said mist may even extend up to the system of baffle plates 8 forming a continuous hindrance across the entire transverse cross-section of the chamber 1. Said baffle plates are formed by oblique blades, grids or like well-known components. They stop the droplets which are carried along by the gas stream while allowing the gas to pass through them.

The liquid formed with the droplets impinging on the baffle plates 8 flows through troughs or channels which are not illustrated into collecting means 9 out of which the liquid may be removed.

It is apparent that the gases passing through the mist 6 and carrying the droplets along with them are in extremely intimate contact with the highly subdivided liquid. Our invention provides, as a matter of fact, an extremely large contacting area. The interaction between the gases and the liquid mist is obtained in the space extending between the nozzles 3 and the baffle plates 8 and chiefly between the transverse plane 5 in which the mist is formed and the baffle plates 8. By reason of the fact that the liquid jets progress in substantial parallelism with the stream of gases, the loss of head in the apparatus is considerably reduced.

Obviously, the throughputs and speeds of the gases and liquids, the apical angle of the jets passing out of the nozzles, the depth of the mist, the spacing between the nozzles and the baffle plates and the like vary according to the treatment to be executed. However, in order to make our invention more readily understandable, it may be mentioned that the preferred conditions are as follows for the purification of smoke gases by ammonia-containing water: pressure in the nozzles 1 to 3 kg. per sq. cm., speed of the gas stream 1 to 10 meters per sec. and preferably 2 to 6 meters per sec., height of the conical jets 4 of droplets passing out of the nozzles about 20 cm., spacing between the nozzles and the baffle plates 20 to 200 cm. and preferably 30 to 70 cm.

It is generally of advantage for the apical angle of the liquid cones 4 to be about 90°, but it may vary within a very broad range.

The details of the complete apparatus are shown, by way of example and in a non-limiting sense, in FIG. 2.

In said FIG. 2, the chamber 1 slopes at 45° and a stream of gases enters the lower end of the chamber at 10 after it has been subjected to a cooling by a sprinkling with water at 11.

The lower section 12 of the arrangement serves as a hydraulic joint beyond which the gases rise inside the chamber 1.

A preliminary treatment of the gases consists in a sprinkling at 13 with the liquor obtained from the actual treatment and extracted from the container or vat 14 provided with an outlet 15.

The references 16, 16' and 16" designate the pumps which serve for the circulation of the different liquors.

A reagent such as ammonia is injected at 17 by means of a series of nozzles of the type described with reference to FIG. 1 or the like.

A trough 18 extending along the inner walls of the chamber 1 serves for collecting the liquid running over the latter so as to lead it into a vat 19.

Between the transverse planes 3 and 8, there extends a series of nozzles similar to those already illustrated in FIG. 1, which produces the mist 6 and is followed by a further similar series of nozzles 3' forming a further mist 6'. The nozzles 3 and 3' are fed by the pump 16' through the channel 2 with the liquor contained in the vat 19 which collects the liquor running out of the trough 18.

The droplets formed by the mists 6 and 6' which are carried along by the gas precipitate and impinge against the baffle plates 8, out of which they flow at 9 to return into the vat 19; the liquor thus formed is therefore reused partly in the same nozzles 3 and 3' whereas any excess liquid flows over at 22 into the terminal vat 14.

A second treating stage is constituted by two series of nozzles 103 and 103' fed by the pump 16" and located on the downstream side of the baffle plates 8. There are thus produced two further successive mists 106 and 106' out of which the droplets carried along by the gas precipitate under the action of the terminal baffle plates 108 so as to flow out through the collector 109 into the vat 20.

The nozzles of the series 103 and 103' are fed through the channel 102 with the liquor recycled out of the vat 20. Said vat is also fed with fresh treating liquor fed out of the channel 21. The excess liquor flows over at 23 into the vat 19. This produces a methodical contacting between the gas and the treating liquor at the three levels of the apparatus to which correspond respectively the vats 14, 19 and 20.

The treated gas passes out of the chamber 1 through a downwardly incurved section 24 acting as a hydraulic joint.

The arrangement may obviously operate with liquids of different types carried respectively inside the vats 14, 19 and 20, in which case the liquids overflowing at 22 and 23 are fed into other containers.

What we claim is:

1. A method for effecting intimate contact between a smoke-containing gaseous stream and an aqueous ammonia-containing liquid stream, which comprises:
 (a) feeding said gaseous stream longitudinally through a liquid-gas contact zone at a velocity of from 1 to 10 meters per second;
 (b) sprinkling the gaseous stream with an aqueous liquid spray impinging said stream transversely of its direction of flow;
 (c) injecting ammonia into said gaseous stream containing said aqueous liquid spray, longitudinally thereof;
 (d) subjecting said gaseous stream to a first treating stage by successively
  (1) projecting at least one group of conical jets of ammonia-containing liquid droplets longitudinally of said zone in the direction of flow of said gaseous stream, the individual jets of said group having their apices spaced across a first plane transverse to said zone and having parallel axes of revolution extending substantially parallel to the direction of flow of said gaseous stream, the individual jets of said first group of jets engaging one another downstream of said plane to form a first liquid mist extending substantially throughout the cross-section of the contact zone, perpendicularly of said axes of revolution;
  (2) passing the gaseous stream through said first liquid mist;
  (3) transporting at least a portion of the aqueous ammonia-containing liquid droplets, from said first mist, in said gaseous stream toward a gas-permeable barrier spaced from 20 to 200 cm. from said first plane defined by the apices of said group of conical jets;
  (4) impinging the aqueous ammonia-containing liquid droplet-laden gaseous stream upon said barrier to remove the liquid droplets from said stream and produce a liquid droplet-free gaseous stream;
  (5) passing the liquid droplet-free gaseous stream through said barrier;
  (6) feeding the liquid droplets removed from the gaseous stream in step (d)(4) to a storage chamber; and
  (7) recycling at least a portion of the aqueous ammonia-containing liquid from said storage chamber to said group of conical jets for the formation of a further mist thereof;

(e) removing the liquid droplet-free gaseous stream from said first treating stage and subjecting said stream to a second treating stage by successively (1) projecting at least one additional group of conical jets of aqueous ammonia-containing liquid droplets longitudinally of said zone in the direction of flow of said gaseous stream, the individual jets of said additional group having their apices spaced across a second plane spaced longitudinally downstream from said gas-permeable barrier transverse to said zone and having parallel axes of revolution extending substantially parallel to the direction of flow of the gaseous stream, the individual jets of said additional group of jets engaging one another downstream of said second plane to form a liquid mist extending substantially throughout the cross-section of the contact zone, perpendicularly of said last mentioned axes of revolution;

(2) passing the gaseous stream through said second liquid mist;

(3) transporting at least a portion of the aqueous-containing liquid droplets from said second mist in said gaseous stream toward a second gas-permeable barrier spaced from 20 to 200 cm. from said second plane defined by the apices of said additional group of conical jets;

(4) impinging the aqueous ammonia-containing liquid droplet-laden gaseous stream upon said second barrier to remove the liquid droplets from said stream and produce a liquid droplet-free gaseous stream;

(5) passing the liquid droplet-free gaseous stream through said second barrier;

(6) feeding the liquid droplets removed from the gaseous stream in step (e)(4) to a second storage chamber; and (7) recycling at least a portion of the aqueous ammonia-containing liquid from said second storage chamber to both the additional group of conical jets in said second treating stage and the first group of conical jets in said first treating stage for the formation of liquid mists therefrom; and (f) removing the liquid droplet-free gaseous stream from the liquid-gas contact zone.

2. The method as defined in claim 1, in which at least one additional group of conical jets is disposed in each of said first and second treating stages, with the apices of the individual jets of said additional groups spaced across planes transverse to the liquid-gas contact zone, said planes being disposed intermediate said first and second planes and said first and second gas-permeable barriers, respectively, to form additional liquid mists extending substantially throughout the cross-section of the liquid-gas contact zone, through which mists the gaseous stream passes prior to impinging the gas-permeable barriers during the respective treating stages.

3. The method as defined in claim 1, in which the several streams of aqueous ammonia-containing liquid droplets are fed under back pressures of from 1 to 3 kg./cm.² to form the several conical jets, and in which each of said jets has a height of 20 cm.

4. The method as defined in claim 1, in which the aqueous liquid stream sprinkled in step (b) thereof is at least in part constituted of a liquid stream recycled from both the first and second storage chambers of said first and second treating stages.

5. An apparatus for effecting intimate contact between a smoke-containing gaseous stream and an aqueous ammonia-containing liquid stream, which comprises:

(a) an elongated inclined chamber having inclined longitudinal walls, a gas inlet disposed adjacent a first, lower end thereof and a gas outlet disposed adjacent the opposite, upper end thereof, said inlet, outlet and chamber defining a flow path for said gaseous stream through said chamber from said inlet to said outlet;

(b) transverse spray means spaced downstream from said gas inlet, said transverse spray means constructed and arranged in said flow path for introducing a liquid spray transversely of said chamber;

(c) longitudinal injection means spaced downstream from said transverse spray means, said longitudinal injection means constructed and arranged in said flow path for introducing ammonia longitudinally of said chamber;

(d) a first treating stage within said flow path and downstream of said longitudinal injection means comprising:

(1) at least a first series of spray nozzles directed toward said outlet for producing a first liquid mist of aqueous ammonia-containing liquid substantially throughout the cross-section of said chamber, said series of nozzles being disposed in alignment with the longitudinal walls of said chamber and being spaced across a first plane extending transversely of the chamber;

(2) a first group of gas-permeable liquid-removing baffle plates within said flow path spaced from 20 to 200 cm. downstream from said first series of nozzles, said first group of baffle plates extending transverse to and across substantially the entire cross-section of said chamber for removing the gaseous ammonia-containing mist from said gas stream flowing in said flow path;

(3) a first vat constructed and arranged outside said chamber for receiving the aqueous ammonia-containing liquid removed from said gaseous stream by said first group of baffle plates; and (4) pumping means constructed and arranged for feeding at least a portion of said aqueous ammonia-containing liquid from said first vat to said first series of nozzles for the repeated formation of a first liquid mist thereby; and (e) a second treating stage within said flow path and downstream of said first group of baffle plates comprising:

(1) at least a second series of spray nozzles directed toward said outlet for producing a second liquid mist of aqueous ammonia-containing liquid substantially throughout the cross-section of said chamber, said second series of nozzles being disposed in alignment with the longitudinal walls of said chamber and being spaced across a second plane extending transversely of the chamber downstream from said first group of baffle plates;

(2) a second group of gas-permeable liquid-removing baffle plates within said flow path spaced from 20 to 200 cm. downstream from said additional series of nozzles, said second group of baffle plates extending transverse to and across substantially the entire cross-section of said chamber for removing the aqueous ammonia-containing mist from said gaseous stream flowing in said flow path;

(3) a second vat constructed and arranged outside said chamber for receiving the aqueous ammonia-containing liquid removed from said gaseous stream by said second group of baffle plates; and (4) pumping means constructed and arranged for feeding a portion of said aqueous ammonia-containing liquid from said second vat to both the second series of nozzles in said second treating stage and the first series of nozzles in said first treating stage for the formation of liquid mists thereby.

References Cited by the Examiner

UNITED STATES PATENTS

| | | | |
|---|---|---|---|
| 746,254 | 12/1903 | Baggaley | 55—474 |
| 746,261 | 12/1903 | Baggaley | 55—474 |
| 880,747 | 3/1908 | Morby | 55—257 X |
| 885,185 | 4/1908 | Serrell | 55—257 X |
| 889,882 | 9/1908 | Matthews | 261—115 X |
| 907,379 | 12/1908 | Laurent. | |
| 971,297 | 9/1910 | Miles | 55—257 |
| 1,117,309 | 11/1914 | Bentz | 55—223 |
| 1,169,919 | 2/1916 | Brassert | 55—257 |
| 1,222,541 | 4/1917 | Donham | 55—257 X |
| 1,365,790 | 1/1921 | Ross | 55—257 X |
| 1,373,231 | 3/1921 | Gardner et al. | 261—116 |
| 1,416,218 | 5/1922 | Lissauer et al. | 55—257 X |
| 1,430,920 | 10/1922 | Mittasch et al. | |
| 1,479,852 | 1/1924 | Engelhardt. | |
| 1,588,834 | 6/1926 | Hogan et al. | |
| 1,793,620 | 2/1931 | Jacoubus | 261—36 |
| 1,908,782 | 5/1933 | Pearce | 55—260 X |
| 1,916,824 | 7/1933 | Braus. | |
| 1,917,895 | 7/1933 | McGarth | 55—257 X |
| 1,979,189 | 10/1934 | Bowers | 55—94 X |
| 2,057,579 | 10/1936 | Kurth | 55—223 |
| 2,090,287 | 8/1937 | Cornelius | 55—257 X |
| 2,124,290 | 7/1938 | Fleisher | 261—115 |
| 2,186,125 | 1/1940 | Roberts | 55—228 |
| 2,554,428 | 5/1951 | Swearingen | 55—257 X |
| 2,579,282 | 12/1951 | Bowers | 55—94 X |
| 2,688,943 | 9/1954 | Wickland | 261—116 X |
| 2,856,171 | 10/1958 | Otto | 55—94 X |
| 2,871,973 | 2/1959 | Rouljob | 55—228 |
| 3,064,408 | 11/1962 | Erga et al. | 55—94 X |
| 3,104,959 | 9/1963 | Grosskinsky et al. | 55—73 X |

FOREIGN PATENTS

| | | |
|---|---|---|
| 23,921 | 10/1911 | Great Britain. |
| 334,660 | 9/1930 | Great Britain. |
| 335,241 | 9/1930 | Great Britain. |
| 354,267 | 1931 | Great Britain. |
| 376,419 | 7/1932 | Great Britain. |

REUBEN FRIEDMAN, *Primary Examiner.*

HARRY B. THORNTON, *Examiner.*